(12) United States Patent
Brown

(10) Patent No.: US 9,411,167 B1
(45) Date of Patent: Aug. 9, 2016

(54) AUTO-MULTISCOPIC 3D BILLBOARD DISPLAY SYSTEM

(71) Applicant: Kedrick F. Brown, Houston, TX (US)

(72) Inventor: Kedrick F. Brown, Houston, TX (US)

( * ) Notice: Subject to any disclaimer, the term of this patent is extended or adjusted under 35 U.S.C. 154(b) by 0 days.

(21) Appl. No.: 15/084,221

(22) Filed: Mar. 29, 2016

(51) Int. Cl.
*G02B 27/22* (2006.01)
*G02B 5/10* (2006.01)
*G09F 13/16* (2006.01)

(52) U.S. Cl.
CPC .............. *G02B 27/2214* (2013.01); *G02B 5/10* (2013.01); *G09F 13/16* (2013.01)

(58) Field of Classification Search
CPC .. G02B 27/2214; G02B 27/225; G02B 5/201; G02B 5/003; H04N 13/0404; H04N 13/0409; H04N 2213/001; H04N 13/0418; H04N 9/3129; H04N 9/3147; G09F 19/18
USPC ......... 359/462, 463, 464, 466, 475, 477, 443, 359/454, 455, 458, 459
See application file for complete search history.

(56) References Cited

U.S. PATENT DOCUMENTS

| | | | |
|---|---|---|---|
| 3,704,055 A * | 11/1972 | Hong | ................... G03B 21/602 359/455 |
| 6,189,246 B1 | 2/2001 | Gorthala | |
| 6,837,585 B2 | 1/2005 | Roggatz | |
| 7,136,031 B2 | 11/2006 | Lee et al. | |
| 7,483,215 B2 | 1/2009 | Raymond | |
| 7,573,491 B2 | 8/2009 | Hartkop et al. | |
| 7,752,792 B2 | 7/2010 | Hsieh et al. | |
| 7,859,750 B2 * | 12/2010 | Akiyama | ............... G03B 21/60 359/454 |
| 8,427,528 B2 | 4/2013 | Saishu et al. | |
| 8,749,722 B2 | 6/2014 | Uehara | |
| 9,146,403 B2 | 9/2015 | Lanman et al. | |
| 2009/0071050 A1 * | 3/2009 | Hines | ...................... G09F 19/22 40/564 |
| 2014/0003762 A1 | 1/2014 | Macnamara | |

* cited by examiner

*Primary Examiner* — Jade R Chwasz
(74) *Attorney, Agent, or Firm* — Louis Ventre, Jr.

(57) ABSTRACT

A billboard display system includes a light source housed in a box-like structure. The light source shines light away from a non-transparent front wall and through a transparent rear wall and thence through a sheet of projection film having an array of images thereon and thence is reflected by a corresponding array of concave mirrors back to corresponding apertures. The apertures are formed at the bottom of indentations, preferably cone-shaped throughout the area of the front wall. The light passes through the apertures and thence out of the indentations to create a 3D image in the eyes of a viewer looking at the front wall.

8 Claims, 7 Drawing Sheets

AUTO-MULTISCOPIC 3D BILLBOARD DISPLAY SYSTEM

TECHNICAL FIELD

In the field of optical systems and elements, a three-dimensional billboard display system includes a film transparency sheet, lamp and concave mirror array specially adapted to project light from the display in a manner that renders different images to viewers in different locations in front of the display.

BACKGROUND ART

The term auto-multiscopic is used to define a display that allows multiple users to view three-dimensional scenes on a display, simultaneously and without the need for 3D glasses.

Standard 3D integral photography was first proposed in 1908 by Gabriel Lippman, as a means of capturing 3D image information using 2D film surfaces. Since then, various methods have been used to display auto-multiscopic 3D images using source images on 2D surfaces, but they all suffer from drawbacks.

SUMMARY OF INVENTION

A billboard display system includes a light source housed in a box-like structure. A viewer, looking at the front wall of the box-like structure would be unable to directly see the light source, which shines light away from the non-transparent front wall and through a transparent rear wall.

Indentations, preferably cone-shaped, are arrayed in a matrix throughout the area of the front wall. The indentations extend inwardly from the front wall to a bottom or point connected to the rear wall. The bottom of each indentation defines an aperture that extends through both the front wall and the rear wall without admitting light into or out of the region of the display behind the front wall from the perspective of a viewer, other than through the aperture.

Adjacent to the outside of the transparent rear wall is a sheet of projection film having on it a printed grid-like array of images. Each image surrounds one of the apertures. A central spot of each image is an optically clear spot, said spot being approximately the same size and shape as the aperture, and each spot being centered on each such aperture.

A concave mirror array facing the sheet of projection film is positioned so that the mirrors in the array can receive light that passes through respective images on the sheet of projection film, and reflect light from these images back toward the corresponding concave mirror focal points located in or near the corresponding apertures. Preferably, there is only air between the sheet of projection film and the concave mirror so as to avoid image distortion, but a lens or other transparent material may be optionally used in that volume. Sending the light out of the multiple apertures and thence out of the corresponding conically shaped indentations, creates 3D (or 2-dimensional) images in the eyes of one or more viewers looking at the front wall of the box-like structure.

Each concave mirror may be part of an enclosure that surrounds each image surrounding an aperture so as to prevent stray light from one such enclosure from mixing with the light within any other enclosure. An enclosure's walls, located between the sheet of projection film and the enclosure's concave mirror, may have any cross-sectional shape.

As examples, the cross-sectional shape of an enclosure's walls may be circular, oval, hexagonal, rectangular, or square.

The concave mirror typically has an aperture-shaped spot at its center from which it is preferable that no incoming light be reflected through the aperture. So, the concave mirror may include a non-reflecting, light absorbing material of approximately the same size and shape of the aperture at this aperture-shaped spot. Alternatively, the concave mirror may define a hole at the aperture-shaped spot and a second light and second sheet of projection film may be used to project the missing image portion through the hole and then out of the aperture.

TECHNICAL PROBLEM

Existing parallax barrier auto-multiscopic displays cause a significant amount of image-related light to be blocked by a parallax barrier from reaching a viewer's eyes, significantly dimming the overall display brightness. For example, pinhole array parallax barriers located between a backlit LCD screen and a viewer trap a lot of light between the LCD display screen and the opaque parallax barrier that contains the pinholes. What is needed is a display that uses concave mirrors to guide much of the light generated inside the display through pinhole apertures in the front of the display.

Some auto-multiscopic displays use arrays of convex lenses to focus light at a corresponding array of focal points in a plane near the display. In such displays, ambient light can be reflected off the convex lenses in unwanted directions, affecting the clarity of the resulting 3D image. What is needed is a display system with a front wall that absorbs a lot of ambient light, and concave mirrors that direct light generated inside the display through pinhole apertures in the front of the display. This arrangement helps to maintain image clarity as the viewer changes positions relative to the display.

Auto-multiscopic displays have also been proposed that use a slab of transparent material to convert planar input light beams into a plurality of directional output light beams that combine to display a 3D image for a viewer. In such a setup, which may also function as a diffractive backlight for an LCD screen, particular regions of the slab of transparent material emit directional light beams at fixed respective angles relative to the plane of the display. What is needed instead is a display comprised of an array of auto-multiscopic pixel generating cells, each of which emits multiple directional light beams from a single focal point. This is achieved by using an array of concave mirrors to reflect light rays generated inside the display through a corresponding array of pinhole apertures and out of the front wall of the display.

Note also that each LCD pixel on an LCD screen can display only one color configuration at a time. Thus, having the ability to simultaneously direct multiple white light rays from different regions of such a diffractive backlight through a single LCD pixel will generally not be a good substitute for an auto-multiscopic pixel at the same location that is capable of emitting differently colored light rays across a variety of angles simultaneously.

Alternately, if the light rays from such a diffractive white backlight pass through an LCD display in close proximity to the backlight, and are then made to converge at focal points in a planar array of focal points parallel to the plane of the LCD screen but closer to the viewer, then the lack of a front wall of the display that has pinholes in it will expose the LCD screen to illumination by ambient light. What is needed is a display that is capable of emitting differently colored light rays at a variety of angles from each auto-multiscopic pixel generating cell through a single focal point for each cell, with no need for time multiplexing to achieve this, and in a way that largely prevents ambient light from interfering with the display.

A 3D display design uses dual LCD screens in its exemplary implementation to create a content adaptive parallax barrier that generates auto-multiscopic 3D images for viewers when illuminated by a backlight. Calculations are made to determine respective images to display on the front and rear LCD screens, generally enabling a brighter auto-multiscopic 3D image to be displayed than would be possible if the front screen were a pinhole array parallax barrier. However, this design does not alter the trajectories of light rays emitted by the rear screen at perpendicular angles to the rear screen before they reach the front screen, meaning that many such light rays can still be attenuated or blocked by the front screen. What is needed is a display design that uses a concave mirror array to redirect light rays emitted from a sheet of projection film adjacent to the rear wall of the display, which initially travel away from the viewer along trajectories perpendicular to the rear wall of the display, through pinhole apertures and out of the front wall of the display.

Some displays are based on the use of a series of projectors (sometimes accompanied by flat side mirrors) that precisely focus their respective images on a common display screen, generating auto-multiscopic pixels on the plane of the display screen. This technique as currently implemented is non-optimal for the following three reasons:

Firstly, the multiple projectors in such a display must be located at a distance from the display screen itself, giving the overall display a large form factor in comparison to a conventional 2D flat screen display. What is needed is a display apparatus that naturally minimizes the distance between projector and display screen, by first projecting light in directions away from a viewer and then reflecting it back through the plane of the display screen using a concave mirror array.

Secondly, the set of 2D pixels that generates each respective auto-multiscopic pixel in the plane of the display screen is determined by the number of projectors in such a display, which must be greater than one to generate any auto-multiscopic effect. What is needed is a display that uses only one integrated projection system to generate auto-multiscopic 3D images, and in which the number of 2D pixels that generates a respective auto-multiscopic pixel in the plane of the display screen can be varied by varying the resolution of the corresponding 2D image on the transparency sheet.

Thirdly, auto-multiscopic pixels in different regions of a display screen of this type emit differently shaped light cones, because the projectors behind the display screen are not arranged behind each point on the display screen with identical symmetry. What is needed is a display in which auto-multiscopic pixel generating cells are relatively uniform in shape, and thus emit light cones that are similar in shape.

SOLUTION TO PROBLEM

The solution is a billboard display system that displays an auto-multiscopic 3D image, which is generated by an array of auto-multiscopic pixels in the space near the billboard that share a common plane. The auto-multiscopic pixels are generated by an array of auto-multiscopic pixel generating cells housed in the billboard. Each auto-multiscopic pixel emits a cone of light rays from a fixed point in space.

The billboard display system enables multiple viewers of the display to see different 3D (or two-dimensional) images on the display from different locations in the space in front of the display.

ADVANTAGEOUS EFFECTS OF INVENTION

The auto-multiscopic 3D display is capable of generating a wide field of view 3D image for a viewer, which exhibits continuous motion parallax for a broad range of viewer positions in front of the billboard.

In operation of the device, light rays are transmitted through the sheet of projection film, also referred to as a transparency sheet. A large portion of these light rays initially travel away from the viewer along trajectories perpendicular to the plane of the display, and are subsequently reflected back by concave mirrors through clear spots in the transparency sheet adjacent to pinholes that lead out of the front of the display. The focal points of these concave mirrors are thus positioned in locations that enable light reflected off the concave mirrors to exit the display through pinholes in the front of the display, and spread into the space in front of the display across a wide range of angles. This results in the generation of a 3D integral image that uses light generated in the display efficiently, and also greatly limits the ability of ambient light to interfere with light emitted by the display.

The short distances between an individual image on the transparency sheet and its respective concave mirror reduce the need for specialized collimating of the light in the display, as light does not travel a great distance from the transparency sheet before reaching the inner reflecting surface of the concave mirror. This helps to limit the angular dispersion of light rays from optimal trajectories perpendicular to the rear wall of the display before these light rays reach the inner reflecting surface of the concave mirror. In other words, the use of a concave mirror enables a significant portion of colored light rays emitted by an individual transparency image to hit the concave mirror at angles from which they can be cleanly reflected through the focal point of the concave mirror and out into the region of space in the front of the display.

Auto-multiscopic pixel density in the display is limited by the dimensions (and focusing precision) of the concave mirrors in the concave mirror array, as well as by the pinhole diameter below which diffraction of visible light becomes a significant issue.

BRIEF DESCRIPTION OF DRAWINGS

The drawings illustrate preferred embodiments of the auto-multiscopic 3D billboard display system according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
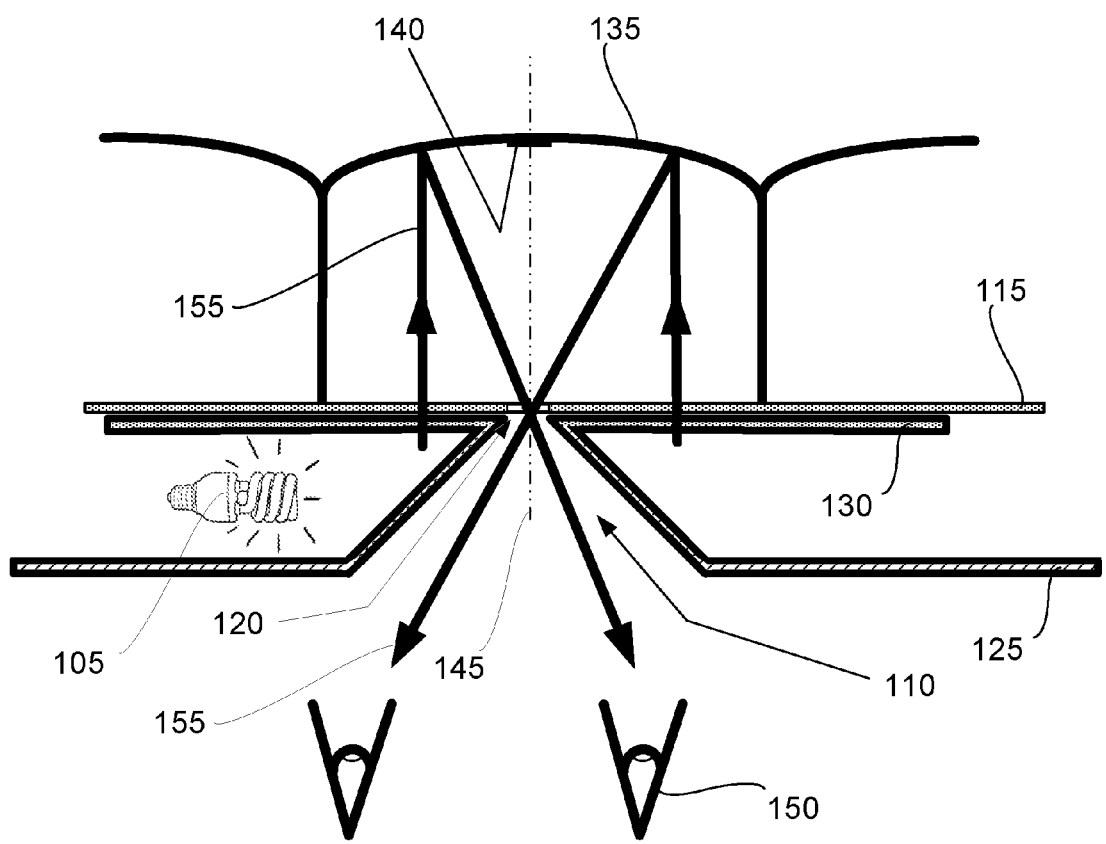
FIG. 1 is a horizontal cross-sectional view of a preferred embodiment of the billboard display system confined to one of the indentations, the view showing the components from the front wall at the bottom of the figure to the concave mirror at the top of the figure.
Figure 11:
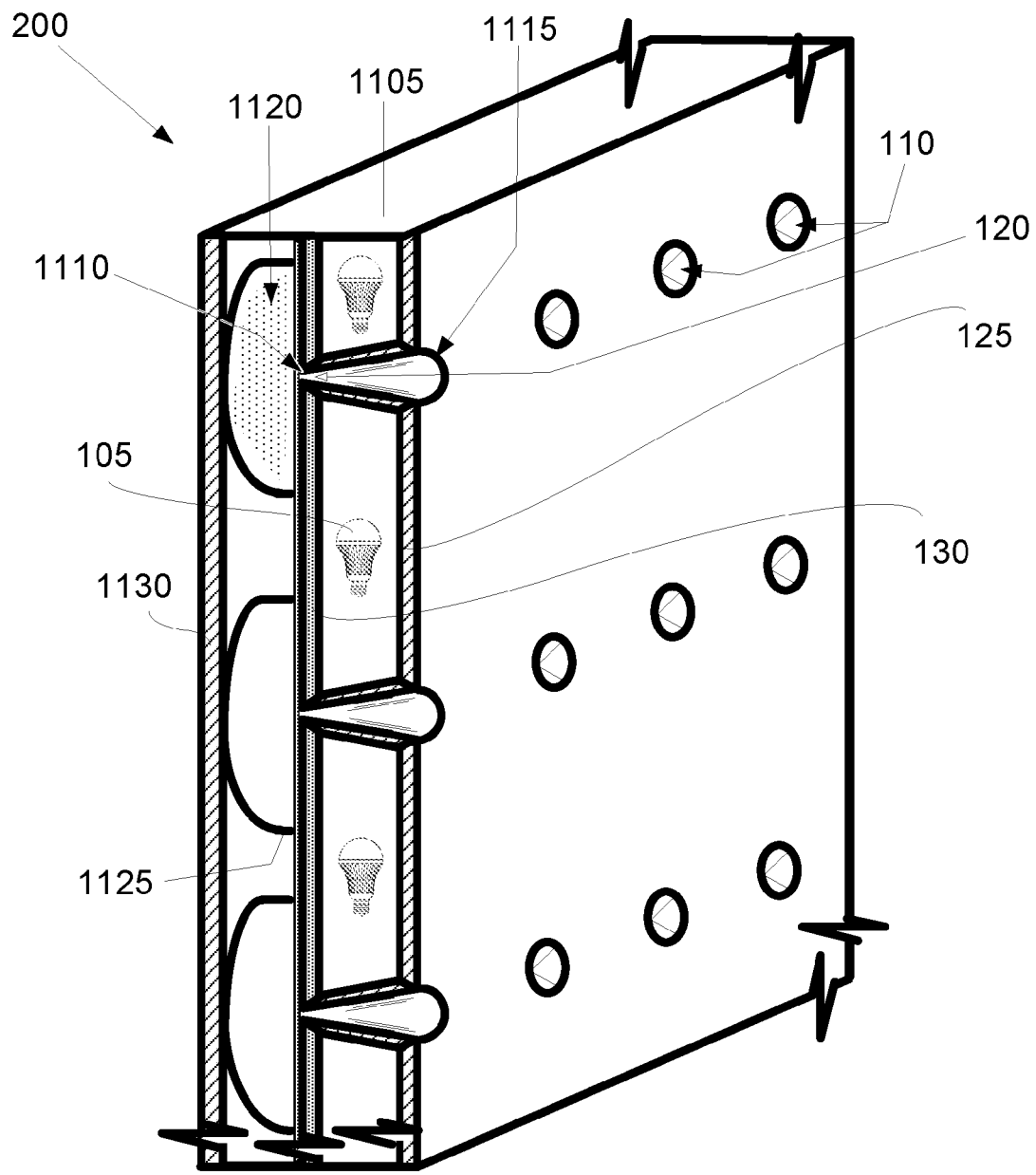
FIG. 11 is a perspective view of the structure shown in a section from the front wall to a back wall past the concave mirror at a vertical imaginary plane slicing midway through indentations on the front wall of the billboard display system, with this imaginary plane also oriented perpendicular to the plane of the front face of the display.
Figure 12:
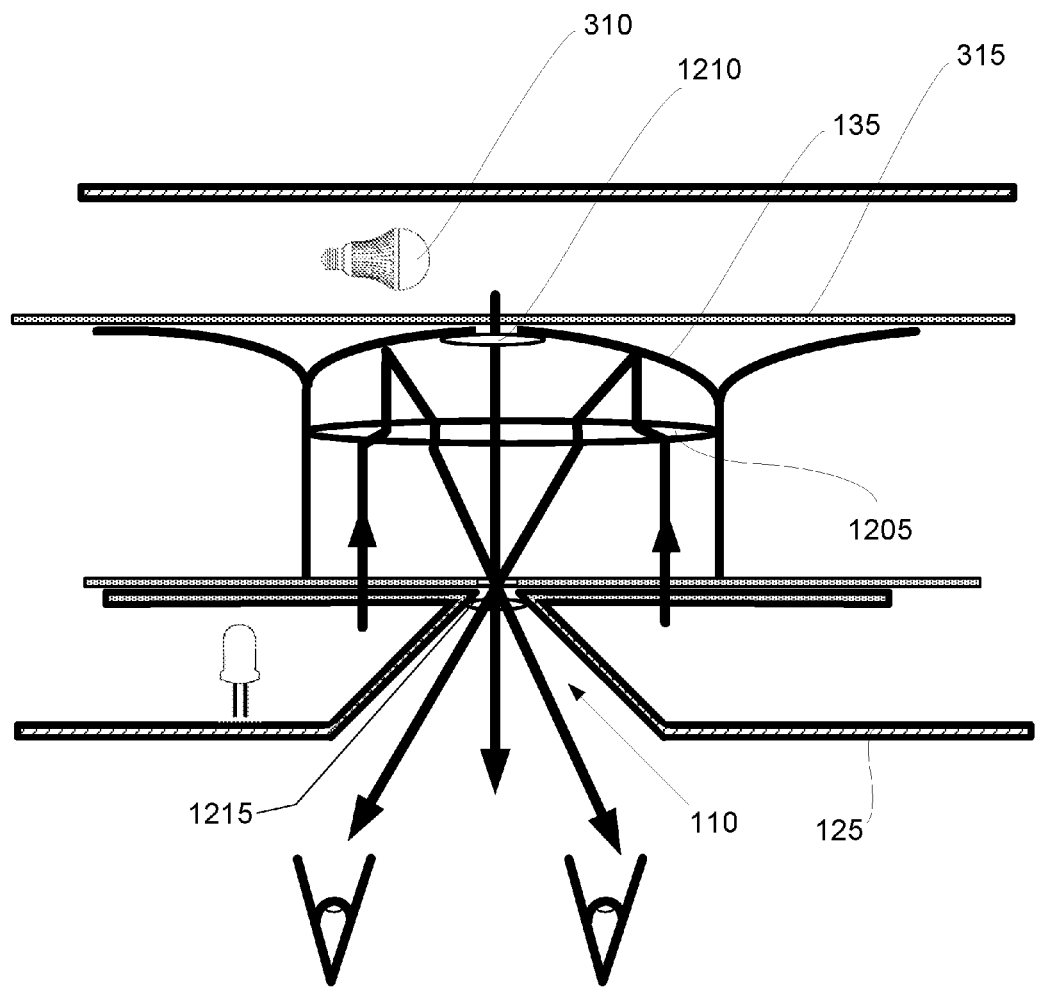
FIG. 12 is a horizontal cross-sectional view of an alternative embodiment of the billboard display system confined to one of the indentations similar to FIG. 2 and including several optional lenses.

FIG. 1 and FIG. 11 illustrate a preferred embodiment of the billboard display system (200). FIG. 1 shows the embodiment in horizontal cross section across the billboard display system (200) confined to one of the indentations (110). This embodiment includes a light source (105), a sheet (115) of projection film with a grid-like array of images (405), and a concave mirror (135) combined together in a specific structural configuration.

The light source (105) is housed in a cuboid structure (1105). The light source (105) is preferably a bulb or any source of continuous (not pulsed) white light. Preferably a white Light Emitting Diode (LED) is used for brightness and longevity.

The cuboid structure (1105) is essentially a rectangular box. The cuboid structure (1105) may be a tile size, such as for example 1 foot by 1 foot, which would facilitate assembling multiple tiles together to make a larger billboard. Alternatively, the cuboid structure (1105) may be a full billboard size, to wit, having a length and width similar to a large highway billboard.

The cuboid structure (1105) is defined in part by a front wall (125) and a rear wall (130) displaced apart from the front wall (125). The rear wall (130) admits passage of light therethrough and is thus transparent. The term transparent is intended to include the concept of translucence, such as would be the case for a frosted window. Frosting would permit the light transmitted therethrough to be of a more muted, uniform appearance.

The front wall (125) is non-transparent, preventing passage of light therethrough. Thus, no light from the light source (105) is transmitted directly to a viewer (150) looking at the front wall (125). The viewer (150) only sees reflected light exiting the billboard display system (200). The viewer never sees an individual transparency image or the entire surface of the transparency directly. This feature enables continuous motion parallax in all directions for a viewer across a wide variety of viewing positions.

The front wall (125) defines indentations (110) extending inwardly from the front wall (125). The indentations (110) may take on any shape, but preferably each is formed in a cone shape (1115) with the base of the cone at the surface of the front wall (125) and the vertex sunk into the cuboid structure (1105) towards a bottom (1110). Thus, each of the indentations has a bottom (1110). The bottom (1110) of the indentation is connected to the rear wall (130), which prevents light from the light source (105) from escaping the interior of the light source (105) by passing through the walls of the indentations (110). The bottom (1110) of each indentation defines an aperture (120) that extends through the front wall (125) and the rear wall (130) without admitting light (155) into or out of any concave mirror enclosure (1125) other than through the aperture (120). Thus, light (155) from the light source (105) is only able to escape the billboard display system (200) by first exiting the rear wall (130) and after reflection from the concave mirror (135), passing through the aperture (120).

Figure 2:
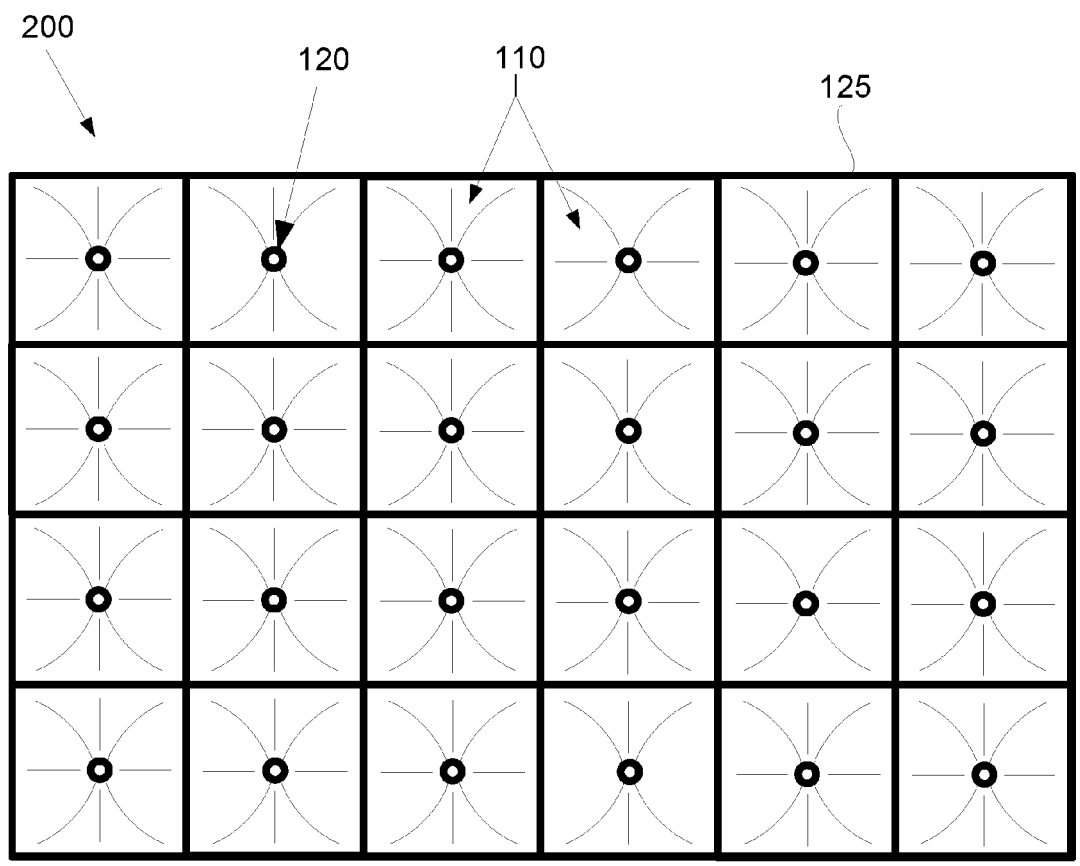
FIG. 2 is a front elevation view of a billboard display showing the indentations.

FIG. 2 illustrates an elevation view of the front wall (125) showing individual pinholes. FIG. 2 is from the perspective of a viewer looking directly at the front of the display. This figure may also be thought of as a "billboard tile," where a billboard is made of a plurality of such billboard tiles held together in a larger frame. The front wall (125) of the billboard display system (200) is preferably painted a light absorbing color like black on the surface that faces the viewer. Each pinhole shown in FIG. 2 is located at the vertex of a cone-shaped indentation in the front wall (125) of the cuboid structure (1105) from the viewer's perspective. This geometry allows light to exit the display in an unobstructed manner across a wide variety of angles. When the light source (105) is energized, the display generates an auto-multiscopic pixel at the focal point of each concave mirror (135).

The sheet (115) of projection film has printed on it a grid-like array of images (405), wherein each image in the grid-like array of images (405) has a spot (410) that is optically clear and centrally located on the image. The spot (410) is approximately the same size and shape as the aperture (120), and each spot (410) is centered on each such aperture (120). The spot may be a hole punched through each of the images, with the intention of further reducing any obstructions to light rays passing through the aperture (120).

The sheet (115) of projection film is located adjacent to the rear wall (130) outside the cuboid structure (1105). Thus, in operation, the light source (105) shines light (155) through the rear wall (130), which is transparent, then through an image on the sheet (115) of projection film. The light from the light source (105) is thus initially transmitted away from a viewer (150).

In an alternative embodiment, when display brightness needs to be increased, each aperture (120), which in operation comprises part of an individual auto-multiscopic pixel generating cell, is served with one or more illuminating white LED lights (i.e. LED lights which are located in the region between the front wall (125) and the rear wall (130)). This would be in contrast to sharing the illumination from a small number of white LED lights among a larger number of auto-multiscopic pixel cells. This embodiment may be practical for large auto-multiscopic billboard displays, but is expected to be much less practical for miniature auto-multiscopic displays. With this embodiment, the brightness of a specific auto-multiscopic pixel cell may be time varied by varying the brightness of the white LED lights.

The concave mirror (135) for each image in the grid-like array of images (405) is preferably a parabolic mirror that focuses light (155) reflected from its surface at a central focal point. Each concave mirror (135) is preferably fixed in a non-movable position and preferably has no mechanical parts operable to move the concave mirror (135).

Figure 10:
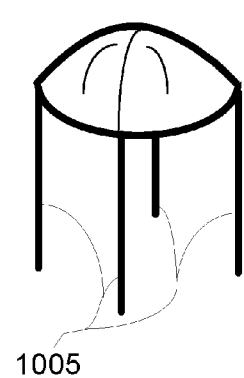
FIG. 10 is a perspective view of a concave mirror section at the top, supported by 4 legs.

Each concave mirror (135) is centered on the aperture (120) below the image and positioned above the sheet (115) of projection film. The concave mirror (135) is configured so that light (155) from the light source (105) housed in the cuboid structure (1105) passes through the rear wall (130), thence through one of the images in the grid-like array of images (405). The light (155) is then reflected off the concave mirror (135) and through the aperture (120) so as to form an emission of light (155) out of the indentation. Thus, the concave mirror (135) is configured to sit a distance away from the sheet (115) of projection film so that its focal point lies in the aperture (120) immediately below the spot (410) on the sheet (115) of projection film, or very near this location. This configuration, as examples, may be by support of 4 legs (1005), as shown in FIG. 10, or it may be attached to a back wall (1130) of the billboard display system (200).

Each concave mirror (135) is preferably positioned within a transparent gaseous environment (1120), such as air. Other environments such as a lens (1205) or a transparent solid may be used, but are not preferred because of their potential to alter the trajectories of light rays transiting from the sheet (115) of projection film to the concave mirror (135) and from the concave mirror (135) to the aperture (120). When a lens (1205) is used, preferably each concave mirror is positioned above its own lens so that the lens (1205) aids the focusing of light emitted from the sheet of projection film (115) in or near the aperture (120). Thus, the billboard display system (200) may be structured so that each concave mirror (135) is positioned above a lens (1205) that aids the focusing of light emitted from the sheet of projection film (115) in or near the aperture (120).

A concave-mirror array could be constructed that tiles the entire plane of the sheet (115) of projection film, also referred to as the transparency sheet, which may be coincident with the width and height of the billboard display system (200). Such a concave-mirror array would be composed of assembled tiles comprised of concave mirror sections that preferably do not leave any gaps through which light (155) from the light source (105) (e.g. LED lamps) could escape in directions away from the viewer (150) looking at the front wall (125) of the cuboid structure (1105), which is effectively the face of the billboard display system (200).

Concave Mirror Assembly Examples

In various embodiments, the concave mirror (135) for each aperture (120) may comprise a concave mirror section that forms part of a large array of adjacent concave mirror sections. This may be efficiently accomplished, for example, by using an array of hexagonally packed concave mirror sections that resemble a so called "fly eye" or "fly's eye" lens sheet.

In such exemplary embodiments, packing of concave mirror sections in a plane would help to maximize the efficient use of light (155) in the billboard display system (200). It is also simpler to fabricate a single "fly's eye" concave mirror array "sheet," in which all concave mirror sections are designed to easily align with the pinholes in the display, than to fabricate a large number of individual concave mirrors and then try to align each one manually.

An array of hexagonally packed concave mirror sections is comprised of individual concave mirror sections (that each resembles a hexagon when viewed through its central axis) tiling a plane, thus generating an overall honeycomb like pattern. Concave mirror section regions are separated from each other by barrier walls running perpendicularly to the plane of the sheet (115) of projection film.

Alternately barrier walls between concave mirror section regions are removed, in which case concave mirror sections would share only edges with each other rather than both edges and barrier walls, an arrangement that is useful if the display lamp emits strongly collimated light, thus reducing unwanted mixing of light between adjacent auto-multiscopic pixel cells. In yet other alternative exemplary embodiments, other packings of concave mirror sections in a plane are possible. Square or rectangular packings, in particular, complement the rectangular packings of 2D pixels on most modern electronic 2D displays.

Enclosure

Each concave mirror (135) is preferably part of an enclosure (1125) that surrounds the image. While not required, the enclosure (1125) is desirable because it helps to isolate or confine the light (155) passing through each image that surrounds an aperture (120) within its respective auto-multiscopic pixel cell.

The concave mirror (135) preferably sits at the top or end of the enclosure (1125) that is most distant from the sheet (115) of projection film. The enclosure (1125) preferably includes non-transparent walls extending from the sheet (115) of projection film to the concave mirror (135) so as to prevent light from adjacent enclosures from entering into it.

The enclosure (1125) preferably has the same cross-sectional shape as the image over which it sits. However, the enclosure (1125) may have any cross-sectional shape. For purposes of this explanation, the cross-section of an enclosure is in a plane parallel to the rear wall (130), located between the transparency sheet (115) and the nearest point or points of the concave mirror section to the transparency sheet. In preferred embodiments, the cross-sectional shape may be selected from the group consisting of circular (505), oval (605), hexagonal (705), rectangular (905) and square (805).

The concave mirror (135) preferably includes a non-reflecting, light absorbing material (140) of approximately the same size and shape as the aperture (120). The non-reflecting, light absorbing material (140) is aligned with the aperture (120) along an imaginary axis perpendicular to the plane of the rear wall (130) of the display that runs through the center of the aperture. Ideally, light (155) from the light source (105) approaches the concave mirror perpendicularly to the plane of the rear wall (130) of the cuboid structure (1105), and since no light from the light source (105) can be emitted towards the concave mirror (135) from within the aperture (120) itself, any light that would normally reflect off this non-reflecting spot and exit the display can safely be considered to be stray light that should be absorbed within the display rather than transmitted to a viewer (150).

This non-reflecting, light absorbing material (140) is preferably black paint. When present, the non-reflecting, light absorbing material (140) is preferably centered on a point on the concave mirror (135) marked by an imaginary line (145) extending perpendicularly from an imaginary plane formed by the rear wall (130), the imaginary line (145) passing through the aperture. When present, the light absorbing material (140) is visible to the viewer (150) as a black spot when looking directly at the aperture (120) head-on.

Figure 3:
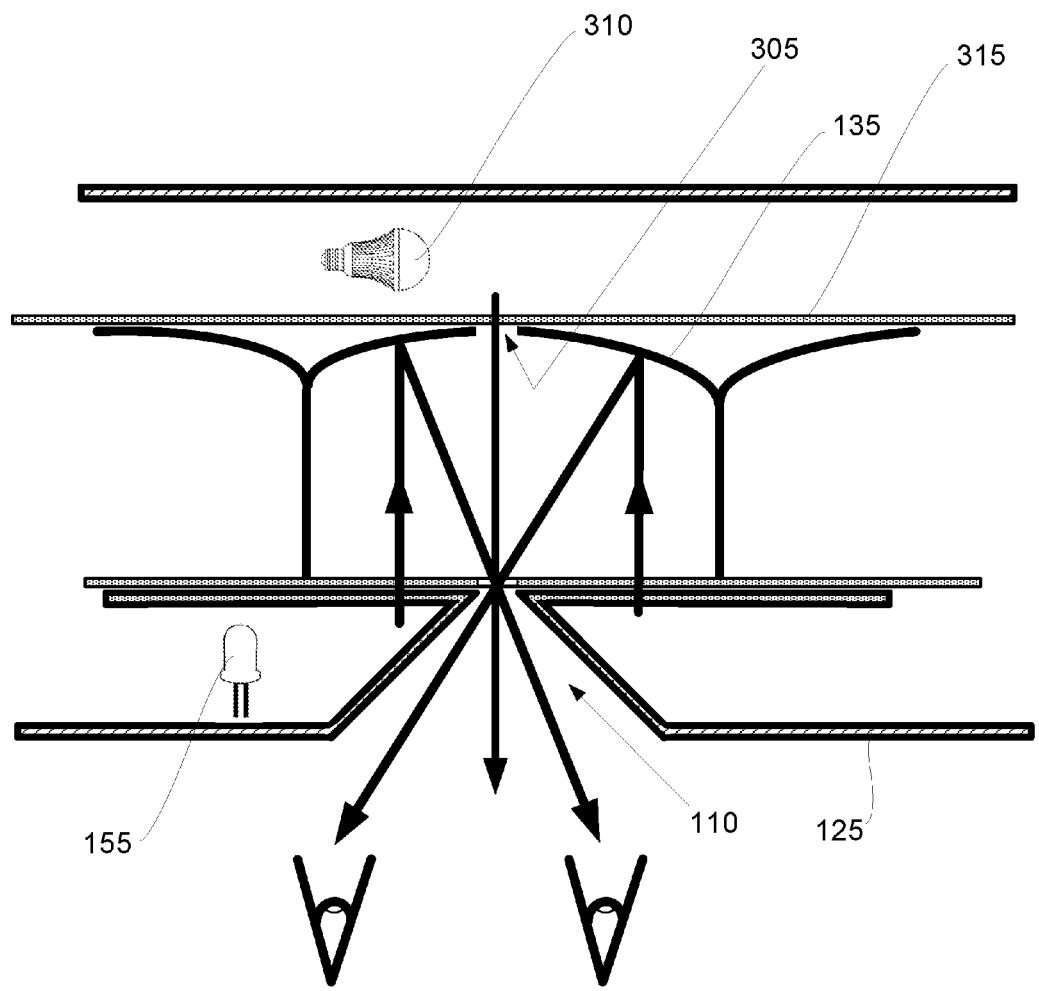
FIG. 3 is a horizontal cross-sectional view of an alternative embodiment of the billboard display system confined to one of the indentations, the view showing the components from the front wall at the bottom of the figure to a second light and a second sheet of transparency film at the top of the figure beyond the concave mirror.
Figure 4:
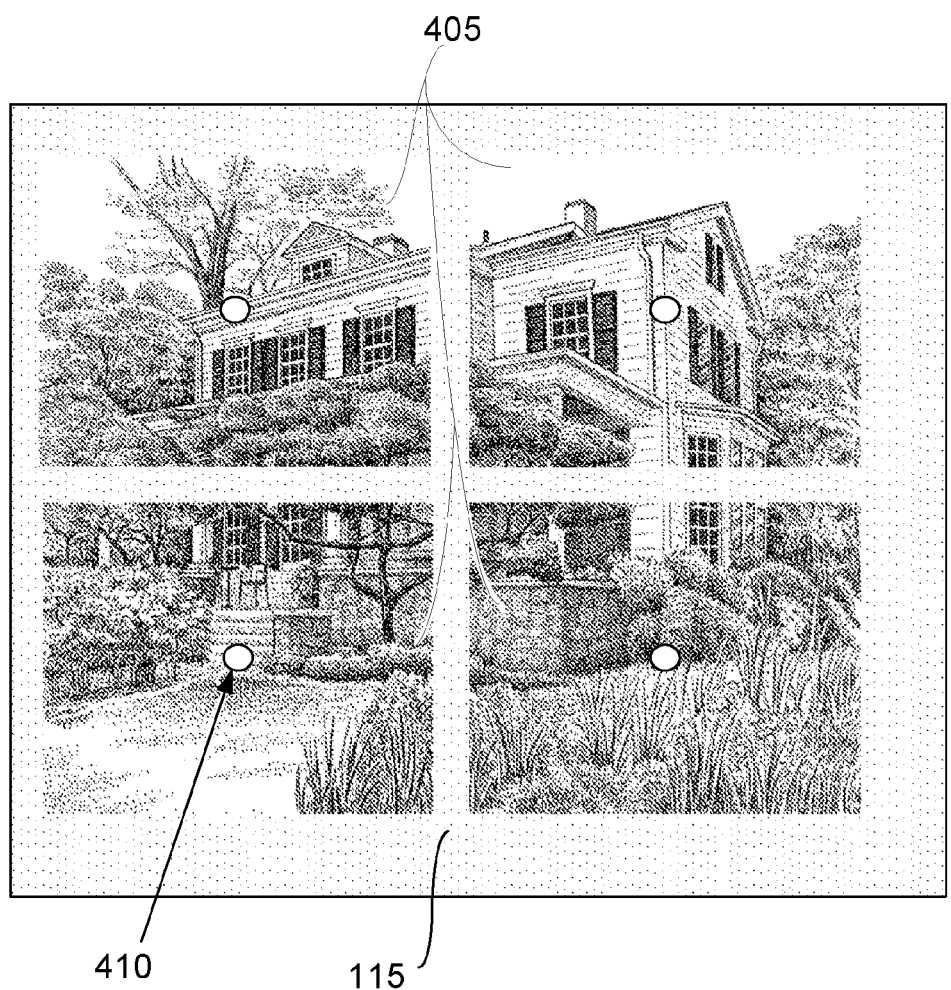
FIG. 4 is a top view of a sheet of projection film showing a grid-like array of 4 images with optically clear spots at their centers, where each optically clear spot is intended to facilitate the release of light through the pinhole aperture of a respective auto-multiscopic pixel generating cell.
Figure 5:
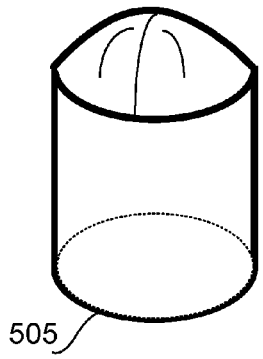
FIG. 5 is a perspective view of an enclosure with a concave mirror section at the top, the enclosure having a circular cross section.
Figure 6:
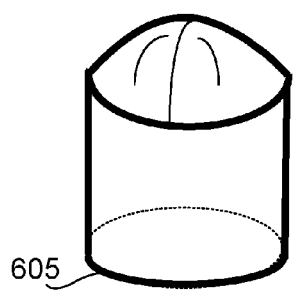
FIG. 6 is a perspective view of an enclosure with a concave mirror section at the top, the enclosure having an oval cross section.
Figure 7:
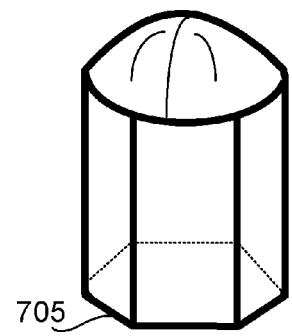
FIG. 7 is a perspective view of an enclosure with a concave mirror section at the top, the enclosure having a hexagonal cross section.
Figure 8:
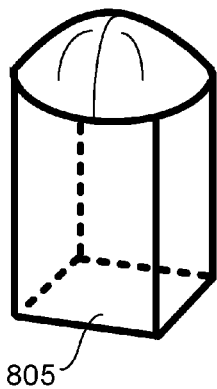
FIG. 8 is a perspective view of an enclosure with a concave mirror section at the top, the enclosure having a square cross section.
Figure 9:
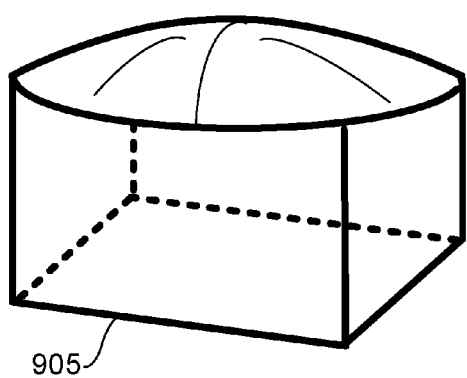
FIG. 9 is a perspective view of an enclosure with a concave mirror section at the top, the enclosure having a rectangular cross section.

Alternatively, the concave mirror (135) optionally defines a hole (305) through the concave mirror (135), the hole (305)

being approximately the same size and shape as the aperture. As with the non-reflecting, light absorbing material (140), the hole (305) is positioned directly above (with respect to its position in FIG. 3) the aperture (120). The hole (305) is located at a point on the concave mirror (135) that is marked by an imaginary line (145) extending perpendicularly from an imaginary plane formed by the rear wall (130), the imaginary line (145) passing through the aperture. When the hole (305) is present, the billboard display system (200) further includes a second light (310) and second sheet (315) (115) of projection film that projects light through the hole (305) and then through the aperture (120). This arrangement thus fills in the image component that would otherwise be missing from the light (155) reflected off the concave mirror (135).

A convex lens (1210) may also be used to focus the light emitted through the hole (305). Such a convex lens (1210) would direct light to the focal point of the concave mirror (135), which resides in or near the aperture (120). Additional third lenses (1215) may also be placed at the bases of the indentations in the front of the display to further alter the angles over which light (155) spreads into the space in front of the display after exiting the apertures in the front wall of the display.

First Exemplary Display

This is an example of a billboard designed to display a static image using: a) a transparency sheet, b) a white light source that also comprises a parallax barrier with an array of pinholes in it, and c) a parabolic mirror array, all of which are enclosed by a display enclosing box. The overall billboard is formed from a 10×10 array of "billboard tiles," each of dimensions 16⅛"×9⅛"×1". Each billboard tile is comprised of the following components:

Front wall of the display: The front wall of the display is a non-transparent, rectangular cuboid shaped plastic or metal parallax barrier measuring 16 1/16"×9 1/16" on its large rectangular face. It is colored black on the side that faces the viewer and is colored either white or a clear reflective color like silver on the side that faces away from the viewer. This front wall contains a 32×18 grid of square pyramid shaped indentations extending into it, whose bases lie in the plane closest to the viewer and whose vertices point away from the viewer (i.e. 576 total indentations). The centers of these square pyramid shaped indentations are spaced ½" apart along both the horizontal and vertical axes of the parallax barrier. The base of each square pyramid shaped indentation in the plane of the front of the display measures 7/16"×7/16". Thus, there is 1/16" of clearance between the edges of the bases of adjacent indentations, and 1/16" of clearance between the edges of the front of the display and the edges of the bases of indentations situated nearest to the edges of the front of the display.

Each of these square pyramid shaped indentations has a 1/32" inner diameter circular pinhole through its vertex, and walls that are 1/32" thick. The front face of the display that the indentations extend into is also 1/32" thick, while the indentations extend an additional 7/32" beyond this front face to their vertices, where they make contact with the rear wall of the display. The walls of the indentations are also _1/32" thick, and their vertices form flat square surfaces measuring 3/32"×3/32" on their faces that face away from a viewer of the display. These vertices have a cylindrical 1/32" diameter hole in their centers. Furthermore, just behind the 4 outermost edges of the front wall of the display from a viewer's perspective are 1/32" thick walls that extend 7/32" behind the front face of the display in directions perpendicular to the front face of the display. These edges end in the same plane parallel to the front face of the display that the vertices of the square pyramid shaped indentations lie in.

Rear wall of the display: The rear wall of the display and the front wall of the display form a display lamp box in combination with each other. The rear wall of the display is a rectangular plastic sheet with dimensions 16 1/16"×9 1/16"×1/64". The sheet is made of a milky white plastic material that admits a lot of light through it, but is not completely clear. This sheet may alternatively be a material that helps facilitate the emission of collimated light from the display lamp box. The sheet contains a 32×18 grid of cylindrical pinholes having 1/32" diameters, which pinholes are aligned with the pinholes at the vertices of the square pyramid shaped indentations in the front wall of the display. The rear wall of the display thus comprises a continuation of the parallax barrier from the perspective of a viewer of the display.

White LED lamps: Multiple white LED lamps are inserted in the volume between the front and rear walls of the display to fill this volume with white light during operation of the display. These lamps are preferably oriented around or near the perimeter of the display, so that they are situated between rows and columns of the square pyramid shaped indentations in the front wall of the display. Thus, in this example, a total of 46 LEDs (i.e. 15+15+8+8) are used as white light sources for the display, along with the necessary power supplies to illuminate them. The white LEDs are thus hidden from a viewer of the display by the front wall of the display.

In operation of this exemplary display, the LEDs are turned on, resulting in white light largely filling the space between the opaque front wall of the display and the transparent rear wall of the display. The transparency of the rear wall enables white light to escape through its surface and subsequently pass through the adjacent transparency sheet.

Transparency Sheet: This sheet of projection film is a plastic transparency sheet of material similar to those used in overhead classroom projectors. This sheet of projection film is placed directly adjacent to the rear wall of the display, so that the rear wall of the display is between the transparency sheet and the front wall of the display. The transparency sheet is 1/125th of an inch in thickness, including the thickness of the ink used to print images on it. When white light (that originates from the white LEDs and passes through the rear wall of the lamp box) impacts the transparency sheet, light rays emerge from the transparency sheet in response, corresponding in large part to an array of colored images printed on the transparency sheet. In this example, the transparency sheet contains a 32×18 grid of color images that each has a square shape. Each of these square-shaped images measures 7/16"× 7/16" and contains a clear, transparent circular space in its center that is 1/32" in diameter. These clear, circular spaces are aligned with the pinholes in the rear and front walls of the display, thus hiding the full transparency images from the direct view of a viewer of the display.

Parabolic mirror enclosure array: A 32×18 grid of bowl shaped parabolic mirror sections is placed over the transparency sheet so that the insides of the parabolic mirrors form domes directly over the disc shaped images on the transparency sheet. The inner surfaces of the parabolic mirror sections are made of (or overlaid with) a highly reflective clear material such as polished silver, and have a 1/32" circular black dot painted in their centers, that helps to prevent stray light from being reflected out of the display. The silhouette of each parabolic mirror section, from a viewpoint along an imaginary line running through the center of that section and perpendicular to the rear wall of the lamp box, is a square of dimensions 7/16"×7/16", which matches the outer diameter of each disc-shaped image. Black colored metal enclosure walls of 1/16" thickness extend from the edges of the parabolic mirror sections (which they are bound to) down to the corresponding images on the transparency sheet, enabling the entire array of parabolic mirror sections and enclosures to be formed as one piece of metal with an overall silhouette measuring 16 1/16"×9 1/16" on its large rectangular face. These enclosure walls surround the corresponding square images on the transparency sheet, providing opaque barriers between adjacent enclosures. Each parabolic mirror section is of the shape formed by applying an imaginary "cookie cutter" in the shape of the square enclosure walls to a parabolic mirror bowl. Thus, the square enclosure walls are each slightly arched away from the plane of the rear wall at the edges where they make contact with the parabolic mirror sections, in order to form sealed edges with the corresponding edges of each parabolic mirror section. The distance between each of the 4 corners of each parabolic mirror section that lies closest to the transparency sheet, and the transparency sheet itself, is 7/32" during operation of the display. The focus of each parabolic mirror is located in the center of the rim of each square enclosure, placing it on the corresponding clear circular space in the transparency sheet during operation of the display, and also enabling light that is reflected off the parabolic mirror to pass through the transparency sheet and subsequently exit the display.

Display enclosing box: A 5-walled box tray, made of opaque material, has 1/16" wall thickness and measures 16 1/8"× 9 1/8" in outer dimensions on its large rectangular face, and 16 1/16"×9 1/16" in inner dimensions on the same face. The 4 smaller rectangular faces of the box tray measure 1" in depth, which includes the 1/16" thickness of the large rectangular face. Finally, the large rectangular face of the box tray has a 3" diameter circular opening in its center, that is used both for ventilation of the display and as a path for the wiring that leads to the LED lamps inside the display. The box tray is used to enclose the parabolic mirror array, transparency sheet and intermediate portion of the display, so that its closed large rectangular face lies behind the parabolic mirror enclosure array from the perspective of a viewer (leaving a spatial region with some clearance inside the display), and its rim edges lie flush with the edges of the front wall of the display. The front wall of the display is covered with a rectangular clear glass or plastic barrier measuring 16 1/8"×9 1/8"×1/16" to protect the display components from the elements. The edges of this clear glass or plastic barrier rest against the rim edges of the 5-walled opaque box tray. Other means may be used to ensure that the components of the display fit snugly together within the display enclosing box.

Second Exemplary Display

A second exemplary embodiment of the billboard display system (200) includes a light source (105), which is essentially a hollow, white-light-emitting lamp box. The lamp box is a cuboid structure (1105) that resembles a billboard and preferably resembles a rectangular cuboid when viewed from a distance. The lamp box has a front wall (125), which is the face of the billboard display system (200) that a viewer (150) would see and a rear wall (130) that encloses the light source (105). The front wall (125) contains a grid-like array of indentations (110) that extend from front wall (125) to the rear wall (130). Each indentation has a tiny pinhole at the bottom of the indention. Each pinhole is also referred to as an aperture (120). Each aperture (120) extends all the way through from front wall (125) to rear wall (130), and thus from the front surface to the rear surface of the lamp box. These indentations (110) have walls that prevent lamp light from escaping the interior of the lamp box through the indentation walls. Light (155) from the light source (105) in the display is thus only able to escape the lamp box through the rear wall (130).

This lamp box's function is similar to the "backlight" of an LCD display, and thus its two faces with the largest surface area have nearly the same length and width as the two faces of the billboard that have the largest surface area. The rear wall (130) of the lamp box thus looks roughly like the surface of an air hockey table from a distance (which also has a grid like array of holes in it).

The lamp box is oriented so that it emits light (155) in directions away from the viewer (150) of the billboard, so that the viewer (150) never sees direct light emitted by the light source (105). To accomplish this, the front wall (125), that is the side of the lamp that the viewer (150) of the billboard can see from the front of the billboard, is non-transparent and preferably colored black or another light absorbing color. The viewer (150) of the billboard can see directly through the pinholes in the lamp box, but is unable to see the light emitted by the light source (105) immediately after it leaves the light source (105), because this light (155) is emitted in directions away from the viewer (150) when the light source (105) is energized.

The illuminated inside rear face of the lamp box, that is the rear wall (130) of the lamp box, is transparent and faces away from the viewer (150) of the display. The outside face of the rear wall (130) is covered with a sheet (115) of projection film, also referred to as a flat film transparency sheet, on which is printed a grid like array of images, preferably circular, disc shaped transparency images of the sort used in overhead projectors. In other words, the transparency sheets are preferably sheets of "color reversal film" (also called "slide film" or "color positive film"). Preferably, one disc shaped image is printed on this transparency sheet for each pinhole in the grid-like array of indentations (110) in the lamp box, and each such disc-shaped image is centered over its respective pinhole in the lamp box.

In the middle of each of the disc-shaped transparency images is located a transparent, clear circular space, also termed a spot (410). The spot (410) is equal in diameter to the pinhole it is adjacent to. Thus, the disc-shaped images on the transparency resemble flat washers or LP records in shape. The clear circular space may be a punched hole, with the intention of further reducing diffraction or any other obstructions to light rays passing through the pinholes. The transparency sheet is overlaid on the outside of the transparent rear wall of the lamp box.

There is a concave mirror (135) for each image in the grid-like array of images (405). Thus, there is a matching array of concave mirrors, preferably parabolic mirrors, each preferably having reflecting surfaces on the inside of each parabolic mirror (its concave side) so that each parabolic mirror reflects incoming light to a focal point at one of the pinholes.

In operation of the display, the light source (105) in the lamp box is first used to illuminate the transparency sheet, preferably resulting in colored light rays being emitted from the transparency sheet in directions away from the viewer (150) of the display. Black and white images may also be used. Light rays emitted away from the viewer (150) and perpendicular to the plane of the transparency sheet then travel a short distance through the volume under the concave mirrors until they reach the inner surface of a respective parabolic mirror. At this point, the light (155) is reflected off the inside surface of that concave mirror (135), and redirected to the focal point of that concave mirror (135). The focal point of each concave mirror (135) is located at, or very near to, the respective pinhole. The light emerging from the pinhole then travels to a viewer (150) at a distance in front of the lamp box.

In operation, a large number of light rays are reflected from each concave mirror (135) and out through the front of the display by passing through the focal point of that concave mirror (135) and thus also through the pinhole centered at the focal point of that concave mirror (135). Since these light rays pass through a common focal point in the display, these focal points behave like light emitting points that are fixed in space, which are termed "auto-multiscopic pixels." Each auto-multiscopic pixel will thus emit a cone of light into the spatial region in front of the display, enabling multiple viewers to see 3D images on the billboard simultaneously.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the advertising industry.

What is claimed is:

1. A billboard display system comprising:
   a light source housed in a cuboid structure, the cuboid structure defined in part by a front wall and a rear wall displaced apart from the front wall, wherein
   the rear wall admits passage of light therethrough,
   the front wall is non-transparent, preventing passage of light therethrough, and
   the front wall defines indentations extending inwardly from the front wall, each of said indentations has a bottom, the bottom connected to the rear wall, the bottom of the indentation defining an aperture that extends through the front wall and the rear wall without admitting light into or out of the cuboid structure from the perspective of a viewer looking at the front wall, other than through the aperture;
   a sheet of projection film on which is printed a grid-like array of images, wherein each image in the grid-like array of images has a spot that is optically clear and centrally located on the image, said spot being approximately the same size and shape as the aperture, and each spot being centered on each such aperture, the sheet of projection film being adjacent to the rear wall outside the cuboid structure; and
   a concave mirror for each image in the grid-like array of images, each concave mirror centered on the aperture below the image and positioned above the sheet of projection film and configured so that light from the light source housed in the cuboid structure passes through the rear wall, thence through the image and then is reflected off the concave mirror and through the aperture so as to form an emission of light out of the indentation.

2. The billboard display system of claim 1, wherein each of a plurality of the indentations is formed in a cone-shape.

3. The billboard display system of claim 1, wherein each concave mirror is positioned within a transparent gaseous environment.

4. The billboard display system of claim 1, wherein each concave mirror is positioned above a lens that further focuses the light on the aperture.

5. The billboard display system of claim 1, wherein each concave mirror is part of an enclosure that surrounds the image, the enclosure comprising non-transparent walls extending from the sheet of projection film to the concave mirror.

6. The billboard display system of claim 5, wherein the enclosure has a cross-sectional shape in a plane parallel to the rear wall, the cross-sectional shape selected from the group consisting of circular, oval, hexagonal, rectangular and square.

7. The billboard display system of claim 1, wherein the concave mirror comprises a non-reflecting, light absorbing material of approximately the same size and shape as the aperture, and centered on a point on the concave mirror marked by an imaginary line extending perpendicularly from an imaginary plane formed by the rear wall, the imaginary line passing through the aperture.

8. The billboard display system of claim 1, wherein the concave mirror defines a hole through the concave mirror, the hole being approximately the same size and shape as the aperture, and positioned at a point on the concave mirror that is marked by an imaginary line extending perpendicularly from an imaginary plane formed by the rear wall, the imaginary line passing through the aperture; and the billboard display system further comprising a second light and second sheet of projection film that projects light through the hole and then through the aperture.

* * * * *